US009906150B1

United States Patent
Xie et al.

(10) Patent No.: US 9,906,150 B1
(45) Date of Patent: Feb. 27, 2018

(54) OPEN LOOP BI-DIRECTIONAL CONVERTERS AND CORRESPONDING CONTROL METHODS

(71) Applicant: Astec International Limited, Kowloon (HK)

(72) Inventors: Yong Tao Xie, Shunde (CN); Ernesto Jr. Zaparita Caguioa, Baguio (PH); Michael Juan Gregorio, Paranaque (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days.

(21) Appl. No.: 15/347,539

(22) Filed: Nov. 9, 2016

(51) Int. Cl.
*H02M 3/335* (2006.01)
*H02M 1/08* (2006.01)
*H02M 1/00* (2006.01)

(52) U.S. Cl.
CPC ......... *H02M 3/33584* (2013.01); *H02M 1/08* (2013.01); *H02M 2001/0009* (2013.01)

(58) Field of Classification Search
CPC ............... H02M 3/33584; H02M 1/08; H02M 2001/0009
See application file for complete search history.

(56) References Cited

U.S. PATENT DOCUMENTS

| 5,815,380 | A | * | 9/1998 | Cuk | H02M 3/005 363/131 |
| 7,433,207 | B2 | | 10/2008 | Thor et al. | |
| 7,692,935 | B2 | | 4/2010 | Yamauchi et al. | |
| 7,848,118 | B2 | * | 12/2010 | Shimada | H02M 1/32 363/127 |
| 8,705,251 | B2 | | 4/2014 | Matsui et al. | |
| 2008/0013351 | A1 | * | 1/2008 | Alexander | H02M 3/1582 363/123 |
| 2014/0313784 | A1 | | 10/2014 | Strzalkowski | |

* cited by examiner

*Primary Examiner* — Emily P Pham
(74) *Attorney, Agent, or Firm* — Harness, Dickey & Pierce, P.L.C.

(57) ABSTRACT

According to some aspects of the present disclosure, open loop bi-directional converters and corresponding control methods are disclosed. Example open loop bi-directional converters include a transformer, one or more primary switches coupled to a primary side of the transformer, one or more secondary switches coupled to a secondary side of the transformer, an input capacitor coupled to an input terminal, an output capacitor coupled to an output terminal, and a primary side controller operable to control the one or more primary switches in an open loop mode at a fixed frequency and a fixed duty cycle. The open loop bi-directional converter is coupled to provide current from the secondary side of the transformer to the primary side of the transformer automatically when the voltage of the input capacitor is reduced below the voltage of the output capacitor.

20 Claims, 5 Drawing Sheets

FIG. 5

# OPEN LOOP BI-DIRECTIONAL CONVERTERS AND CORRESPONDING CONTROL METHODS

FIELD

The present disclosure relates to open loop bi-directional converters and corresponding control methods.

BACKGROUND

This section provides background information related to the present disclosure which is not necessarily prior art.

Bidirectional converters are able to transfer power in both directions between an input of the converter and an output of the converter. Bidirectional converters are useful in applications requiring transfer of power from a source to a load and also from the load back to the source, such as battery backup applications, etc.

SUMMARY

This section provides a general summary of the disclosure, and is not a comprehensive disclosure of its full scope or all of its features.

According to one aspect of the present disclosure, an open loop bi-directional converter includes an input terminal for receiving an input voltage, an output terminal for providing an output voltage to a load, and a transformer coupled between the input terminal and the output terminal. The transformer has a primary side and a secondary side. The converter also includes one or more primary switches coupled between the input terminal and the primary side of the transformer, and one or more secondary switches coupled between the output terminal and the secondary side of the transformer. An input capacitor is coupled to the input terminal, and an output capacitor coupled to the output terminal. The converter also includes a primary side controller coupled to one or more primary switches, the primary side controller operable to control the one or more primary switches in an open loop mode at a fixed frequency and a fixed duty cycle. The open loop bi-directional converter is coupled to provide current from the primary side of the transformer to the secondary side of the transformer when a voltage of the input capacitor is greater than a voltage of the output capacitor, and the open loop bi-directional converter is coupled to automatically provide current from the secondary side of the transformer to the primary side of the transformer when the voltage of the input capacitor is reduced below the voltage of the output capacitor.

According to another aspect of the present disclosure, an open loop bi-directional converter includes an input terminal for receiving an input voltage, an output terminal for providing an output voltage to a load, and a transformer coupled between the input terminal and the output terminal. The transformer has a primary side and a secondary side. The converter also includes one or more primary switches coupled between the input terminal and the primary side of the transformer, and one or more secondary switches coupled between the output terminal and the secondary side of the transformer. An input capacitor is coupled to the input terminal, and an output capacitor coupled to the output terminal. The converter also includes a secondary side controller coupled to one or more primary switches and the one or more secondary switches, the secondary side controller operable to control the one or more primary switches and the one or more secondary switches in an open loop mode at a fixed frequency and a fixed duty cycle. The open loop bi-directional converter is coupled to provide current from the primary side of the transformer to the secondary side of the transformer when a voltage of the input capacitor is greater than a voltage of the output capacitor, and the open loop bi-directional converter is coupled to automatically provide current from the secondary side of the transformer to the primary side of the transformer when the voltage of the input capacitor is reduced below the voltage of the output capacitor.

According to another yet another aspect of the present disclosure, a method of operating an open loop bi-directional converter is disclosed. The converter includes a transformer having a primary side coupled to an input terminal and a secondary side coupled to an output terminal, one or more primary switches coupled to the primary side of the transformer, one or more secondary switches coupled to the secondary side of the transformer, an input capacitor coupled to the input terminal, and an output capacitor coupled to the output terminal. The method includes controlling the one or more primary switches in an open loop mode at a fixed frequency and a fixed duty cycle, transferring current from the primary side of the transformer to the secondary side of the transformer when a voltage of the input capacitor is greater than a voltage of the output capacitor, and transferring current from the secondary side of the transformer to the primary side of the transformer automatically when the voltage of the input capacitor is reduced below the voltage of the output capacitor.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
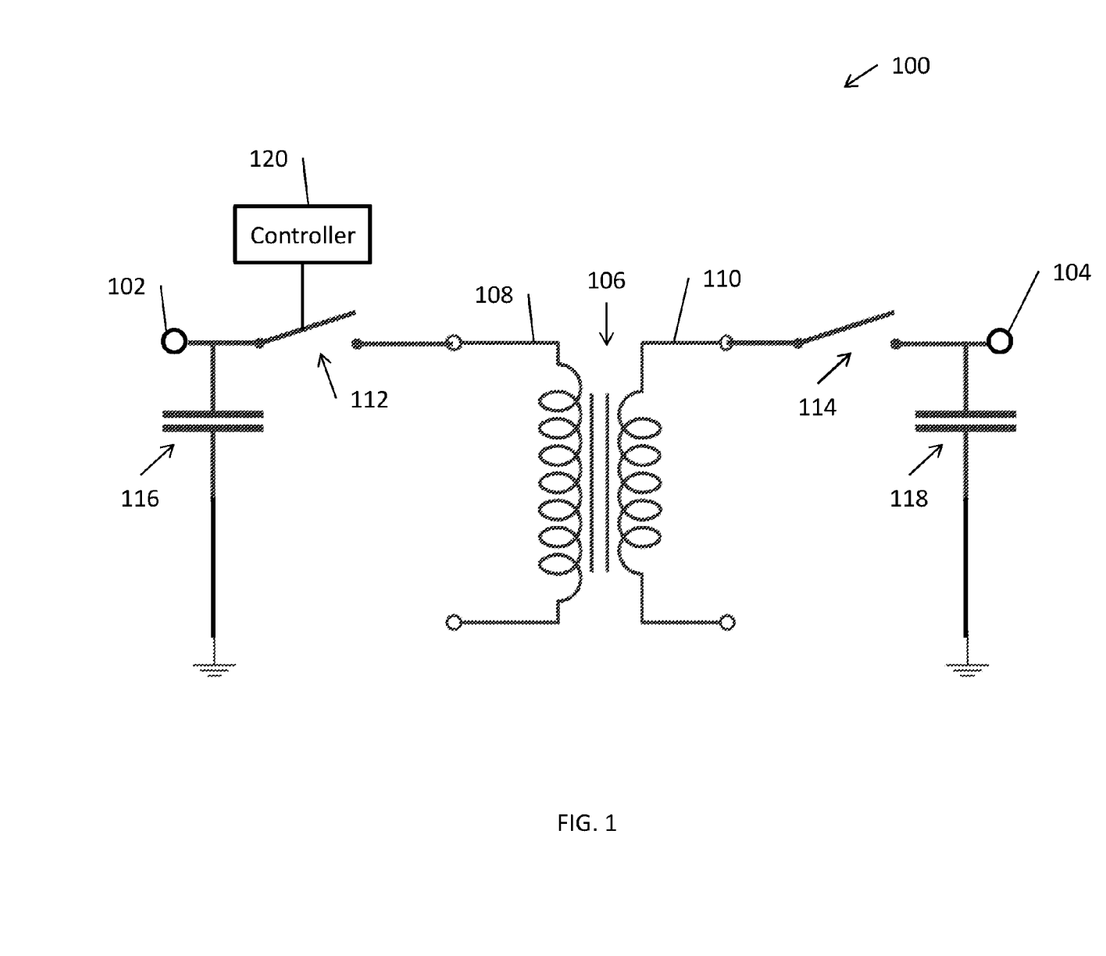
FIG. 1 is a circuit diagram of an open loop bi-directional converter according to one example embodiment of the present disclosure.

An open loop bi-directional converter according to one example embodiment of the present disclosure is illustrated in FIG. 1 and indicated generally by reference number 100. As shown in FIG. 1, the open loop bi-directional converter 100 includes an input terminal 102 for receiving an input voltage, and an output terminal 104 for providing an output voltage to a load. A transformer 106 is coupled between the input terminal 102 and the output terminal 104. The transformer 106 has a primary side 108 (e.g., primary windings of the transformer) and a secondary side 110 (e.g., secondary windings of the transformer).

A primary switch 112 is coupled between the input terminal 102 and the primary side 108 of the transformer 106. A secondary switch 114 is coupled between the output terminal 104 and the secondary side 110 of the transformer 106. An input capacitor 116 is coupled to the input terminal 102, and an output capacitor 118 is coupled to the output terminal 104.

The converter 100 also includes a primary side controller 120 coupled to the primary switch 112. The primary side controller 120 is operable to control the primary switch 112 in an open loop mode at a fixed frequency and a fixed duty cycle.

The open loop bi-directional converter 100 is coupled to provide current from the primary side 108 of the transformer 106 to the secondary side 110 of the transformer 106 when a voltage of the input capacitor 116 is greater than a voltage of the output capacitor 118. For example, the coupling arrangement (e.g., circuit topology, etc.) of components of the converter 100 can allow the converter 100 to provide current from the primary side 108 of the transformer 106 to the secondary side 110 of the transformer 106 when the voltage of the input capacitor 116 is greater than the voltage of the output capacitor 118. The converter 100 is also coupled to automatically provide current from the secondary side 110 of the transformer 106 to the primary side 108 when the voltage of the input capacitor 116 is reduced below the voltage of the output capacitor 118.

Accordingly, the converter 100 may be considered as an open-loop, self-controlled, bi-directional converter with synchronous rectification. In a forward direction, energy is transferred from the primary side 108 of the transformer 106 to the secondary side 110, to thereby charge the output capacitor 118 to an output voltage dictated by a turns ratio of the transformer 106 (i.e., a multiple of the input capacitor voltage, based on a ratio of winding turns on the primary side 108 compared to winding turns on the secondary side 110).

In a reverse direction, energy stored at the output capacitor 118 is delivered back to the primary side 108 of the transformer. The reverse direction of current transfer can occur automatically when the voltage at the input capacitor 116 decreases below the voltage at the output capacitor 118. This may reduce (e.g., inhibit, eliminate, etc.) a voltage dip at the input capacitor 116 when the operating mode of the converter 100 changes (i.e., changes from transferring current in a forward direction to transferring current in a reverse direction).

As described herein, a voltage of the input capacitor 116 may be considered as less than a voltage of the output capacitor 118 when the input capacitor voltage as modified by a turns ratio of the transformer is less than the output capacitor voltage. For example, when a turns ratio of the transformer is 1:1, the input capacitor voltage may be considered less than the output capacitor voltage when the exact value of the input capacitor voltage is less than the exact voltage of the output capacitor (e.g., when an input capacitor voltage is reduced below 48 V as compared to a 48 V output capacitor voltage).

When the turns ratio of the transformer 106 is other than 1:1, the output capacitor voltage may be compared to the input capacitor voltage as modified by the turns ratio. For example, in a step-up converter having a transformer turns ratio of 1:2, the input capacitor voltage may be considered to be less than the output capacitor voltage when the input capacitor voltage is less than half the output capacitor voltage (e.g., when an input capacitor voltage is reduced below 24 V as compared to a 48 V output capacitor voltage).

In some embodiments, a turns ratio of 1:N (N>1) may increase (e.g., maximize, etc.) energy stored at the output capacitor.

As another example, in a step-down converter having a transformer turns ratio of 2:1, the input capacitor voltage may be considered to be less than the output capacitor voltage when the input capacitor voltage is less than double the output capacitor voltage (e.g., when an input capacitor voltage is reduced below 48 V as compared to a 24 V output capacitor voltage).

Figure 2:
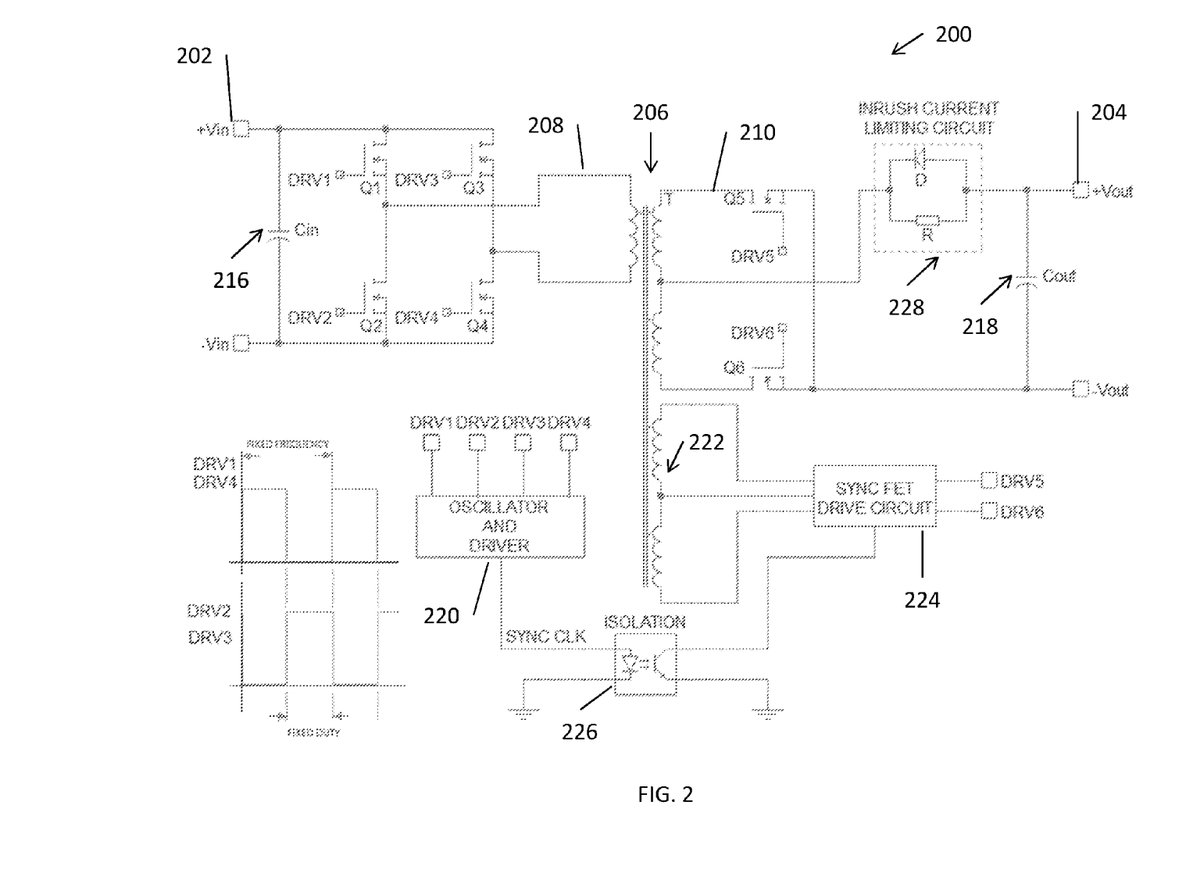
FIG. 2 is a circuit diagram of another open loop bi-directional converter according to another example embodiment of the present disclosure.

FIG. 2 illustrates an open loop bi-directional converter 200 according to another example embodiment of the present disclosure. Similar to the converter 100 of FIG. 1, the converter 200 of FIG. 2 includes a transformer 206 coupled between an input terminal 202 and an output terminal 204. The transformer 206 has a primary side 208 and a secondary side 210.

The converter 200 also includes four primary switches Q1-Q4 coupled between the input terminal 202 and the primary side 208 of the transformer 206. The primary switches Q1-Q4 are arranged in a full bridge circuit topology. Accordingly, the primary side controller 220 may operate the primary switches Q1-Q4 as a symmetrical full-bridge converter when transferring current in a forward (e.g., charge) direction from the primary side 208 of the transformer 206 to the secondary side 210.

Although the converter 200 includes four primary switches arranged in a full bridge topology, it should be apparent that in other embodiments the converter 200 may include more or less primary switches (e.g., two switches, etc.). The converter 200 may include primary switches arranged in circuit topologies other than a full-bridge, including but not limited to a push-pull converter circuit topology, a half-bridge circuit topology, etc.

The converter 200 includes two secondary switches Q5 and Q6 coupled between the output terminal 204 and the secondary side 210 of the transformer 206. The two secondary switches Q5 and Q6 are arranged in a push-pull circuit topology, and provide synchronous rectification for the converter 200. It should be apparent that in other embodiments, the converter 200 may include more or less secondary switches (e.g., four switches, etc.). The converter 200 may include secondary switches arranged in circuit topologies other than a push-pull, including but not limited to a half-bridge circuit topology, a full-bridge circuit topology, etc.

As shown in FIG. 2, the transformer 206 includes an auxiliary winding 222. A secondary side synchronization circuit 224 (e.g., secondary side controller) is coupled to the auxiliary winding 222 to detect a phase of the voltage on the secondary side 210 of the transformer 206. The secondary side synchronization circuit 224 is configured to operate secondary switches Q5 and Q6 in a synchronous rectification mode, based on the detected phase of the voltage at the secondary side 210 of the transformer 206.

The converter 200 also includes an isolator 226 coupled between the primary side controller 220 and the secondary side synchronization circuit 224. The isolator 226 is coupled to provide a synchronization signal from the primary side controller 220 to the secondary side synchronization circuit 224, to further improve the accuracy of the secondary side synchronization circuit 224 in controlling the phase of the secondary switches Q5 and Q6. For example, the secondary side synchronization circuit 224 can control the phase of the secondary switches Q5 and Q6 based on a combination of the voltage phase detected at auxiliary winding 222 and the synchronization signal received from the isolator 226.

The primary side controller 220 operates the primary switches Q1-Q4 at a fixed duty cycle and a fixed frequency. Example pulse drive signals DRV1-DRV4 from the primary side controller 220 to the respective primary switches Q1-Q4 are illustrated in FIG. 2. In this example, drive signals DRV1-DRV4 have a same frequency and duty cycle, with signals DRV1 and DRV4 being opposite signals DRV2 and DRV3. Accordingly, the primary side controller 220 operates the converter 200 in an open loop mode. There is no voltage feedback provided to the primary side controller 220 to affect operation of the primary side switches Q1-Q4.

A synchronization signal SYNC CLK is provided to the secondary side synchronization circuit 224 via the isolator 226, to improve timing control of secondary side switches Q5 and Q6 by the secondary side synchronization circuit 224. For example, the secondary side synchronization circuit 224 may be configured to operate the secondary switches Q5 and Q6 in an open loop mode at a fixed frequency and a fixed duty cycle. The fixed frequency and a fixed duty cycle of the secondary switches Q5 and Q6 may be substantially similar to the fixed frequency and the fixed duty cycle of primary switches Q1-Q4. For example, the synchronization signal SYNC CLK may correspond to the frequency, duty cycle, etc. of one or more of the primary switch drive signals DRV1-DRV4.

When operating in the forward direction (e.g., charge) mode of operation, the converter 200 uses a symmetrical full-bridge circuit topology to transfer current from the primary side 208 of the transformer 206 to the secondary side 210. When operating in the reverse direction (e.g., discharge) mode of operation, the converter 200 uses a push-pull converter circuit topology to transfer current from the secondary side 210 of the transformer 206 to the primary side 208.

The current transfer direction may be self-controlled, such that the current direction changes automatically when a voltage at the input capacitor 216 reduces below a voltage at the output capacitor 218. The change in current direction may be considered self-controlled, automatic, etc. such that current direction may be changed without any adjustment to operation of one or more (or all) of the primary side controller 220, the secondary side synchronization circuit 224, the primary switches Q1-Q4, the secondary switches Q5 and Q6, etc. For example, the converter 200 may not rely on any voltage detection, any voltage feedback, any controller and/or switch adjustment, etc. to change direction of current flow in the converter 200.

The converter 200 may reduce (e.g., eliminate) the need for control signals to the primary and secondary side of the converter 200 to control power flow direction, which may reduce (e.g., eliminate) complicated signal control and timing control when the operating direction mode of the converter 200 changes. For example, a reverse/discharge direction mode may automatically occur when the voltage at the input capacitor 216 decreases below the voltage at the output capacitor 218. This may inhibit (e.g., prevent) voltage dip at the input capacitor 216 when the operating mode of the converter 200 when the operating mode of the converter changes. In some embodiments, the forward/charge mode may occur primarily when charging the output capacitor 218 at start-up of the converter 200. During normal operating conditions, minimal load current may be expected with magnetizing current expected on the primary side 208 of the transformer 206.

As shown in FIG. 2, the converter 200 also includes a current limiting arrangement 228 coupled between the secondary side 210 of the transformer 206. The current limiting arrangement 228 is coupled to inhibit an inrush current at startup of the converter 200.

As shown in FIG. 2, the current limiting arrangement 228 includes a current limiting resistor R in parallel with a diode D. The resistor R may have a resistance value suitable to provide surge capability. The diode D may be any suitable diode (e.g., a high-voltage Schottky diode, etc.) capable of serving as a discharge path for current when the converter 200 is operating in a reverse current mode. It should be apparent that other embodiments may include any other suitable current limiting arrangement, including but not limited to a current limiting switch coupled to inhibit inrush current at startup using active current limiting, etc.

The input terminal 202 may be any terminal suitable for receiving an input voltage from a voltage source, including but not limited to a connector, a wire, a circuit node, etc. The source may be any suitable input voltage source, including utility mains, an alternating current (AC) source, a direct current (DC) source, etc. The source may have any suitable input voltage, including about 400 VDC, 60 VDC, 48 VDC, etc. Similarly, the output terminal 204 may be any terminal suitable for providing an output voltage to a load, including but not limited to a connector, a wire, a circuit node, etc. The load may be any suitable load, including an output of a power supply, electrical equipment, an AC load, a DC load, etc. The load may demand any suitable input voltage, including about 400 VDC, 60 VDC, 48 VDC, etc.

Although the primary switches Q1-Q4 and secondary switches Q5 and Q6 are illustrated as field-effect transistors (FETs), it should be apparent that any other suitable switches may be used, including bipolar-junction transistors (BJTs), etc. In some embodiments, the primary switches Q1-Q4 may include metal-oxide-semiconductor field-effect transistors (MOSFETs), which may have fast body diodes (e.g., a reverse recovery time of less than 100 ns, etc.). The secondary switches Q5 and Q6 may include a stacked MOSFET configuration used for synchronous rectification in the forward/charge mode and for pull-push operation in the reverse/discharge mode to increase a breakdown voltage.

The isolator 226 may include any element capable of transmitting a signal from the primary side to the secondary side of the converter 200, while maintaining isolation between the primary side and the secondary side. For example the isolator 226, may include an optocoupler (e.g., a high-speed optocoupler), etc. The synchronization signal may be used for deadtime control of the synchronous rectifier switches.

The primary side controller 220 and the secondary side synchronization circuit 224 may be configured to control their respective switches using any suitable combination of hardware and software. For example, the controller 220 and circuit 224 may include any suitable circuitry, logic gates, microprocessor(s), computer-executable instructions stored in memory, etc. operable to cause the controller 220 and circuit 224 to perform actions described herein (e.g., controlling the primary switches Q1-Q4, controlling the secondary switches Q5 and Q6, etc.).

The converter 200 may be used in applications where increased hold-up time is desired, where the converter 200 is coupled to a capacitor bank, a backup battery, etc.

For example, in one embodiment the converter 200 can be used with a 48V, 240 W power supply module that includes input capacitor 216. If the power supply module has a normal hold-up time of approximately 54.6 ms (e.g., the output voltage is maintained for about 54.6 ms after the input voltage is terminated), using the converter 200 in the power supply module may increase the hold-up time by approximately 16.2 ms, resulting in a total hold-up time of approximately 70.8 ms. These hold-up time periods are provided for purposes of illustration only, and it should be apparent that other embodiments may include any other suitable hold-up times.

In the above example, about four Joules of energy stored at the output capacitor 218 are recovered and used to provide the increased hold-up time. The converter 200 may also provide slower output voltage decay for a power supply module, as compared to a power supply module that does not include the converter 200. As should be apparent, other example embodiments may include converters used in other power supply modules, converters having different hold-up times, etc.

Figure 3:
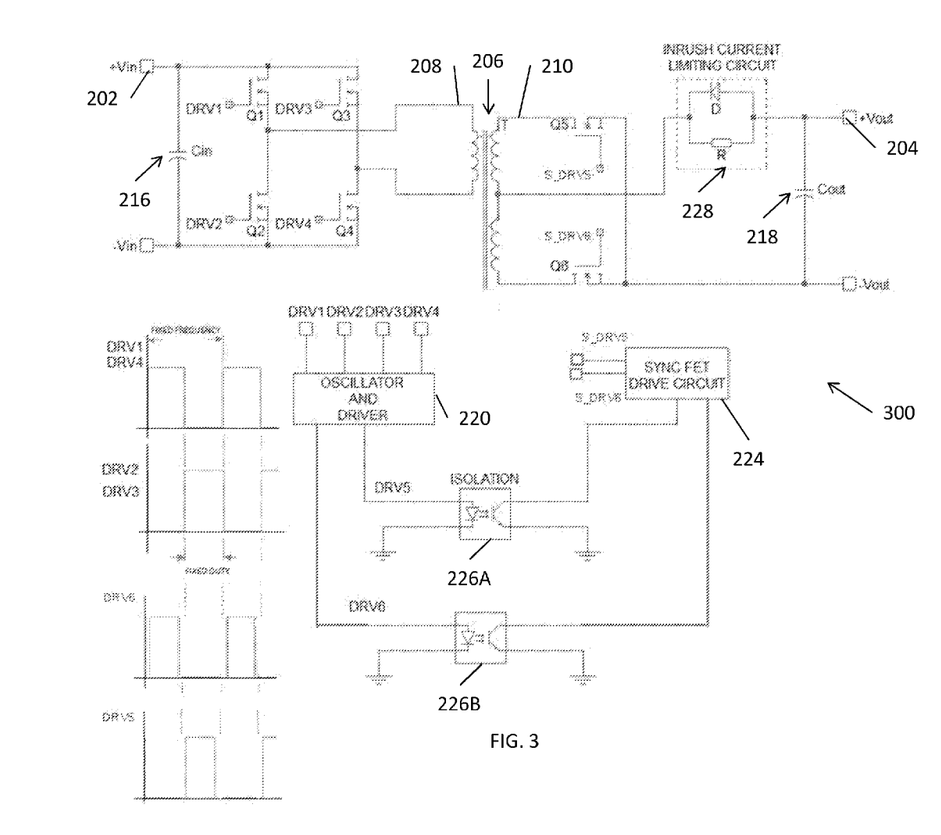
FIG. 3 is a circuit diagram of the open loop bi-directional converter of FIG. 2 having multiple isolators.

FIG. 3 illustrates an open loop bi-directional converter 300 according to another example embodiment of the present disclosure. The converter 300 of FIG. 3 is similar to the converter 200 of FIG. 2, but includes two isolators 226A and 226B for transmitting drive signals DRV5 and DRV6 from the controller 220 to the secondary side synchronization circuit 224.

In this case, the controller 220 generates the drive signals DRV5 and DRV6 to provide control of secondary switches Q5 and Q6. For example, as illustrated in FIG. 3, drive signal DRV6 corresponds to drive signals DRV1 and DRV4 so that secondary switch Q6 will be turned on while primary switches Q1 and Q4 are turned on. Drive signal DRV5 corresponds to drive signals DRV2 and DRV3 so that secondary switch Q5 will be turned on while primary switches Q2 and Q3 are turned on. Drive signals DRV5 and DRV6 may have a fixed frequency and/or duty cycle.

Secondary side synchronization circuit 224 is coupled to isolator 226A to receive drive signal DRV5, and is coupled to isolator 226B to receive drive signal DRV6. The secondary side synchronization circuit 224 can operate secondary side switches Q5 and Q6 according to the received drive signals DRV5 and DRV6 to provide synchronous rectification in the converter 300.

Because drive signals DRV5 and DRV6 are provided to the secondary side synchronization circuit 224 to control secondary side switches Q5 and Q6, the secondary side synchronization circuit 224 in this example is not coupled to an auxiliary winding of the transformer 206 to detect a phase of the voltage on the secondary side 210 of the transformer 206. Although drive signals DRV5 and DRV6 may reduce, eliminate, etc. the need for the secondary side synchronization circuit 224 to detect a phase of the voltage on the secondary side 210 of the transformer 206, it should be apparent that other embodiments may include a transformer having an auxiliary winding, a secondary side synchronization circuit coupled to an auxiliary winding to detect a phase on the secondary side of the transformer, etc.

Figure 4:
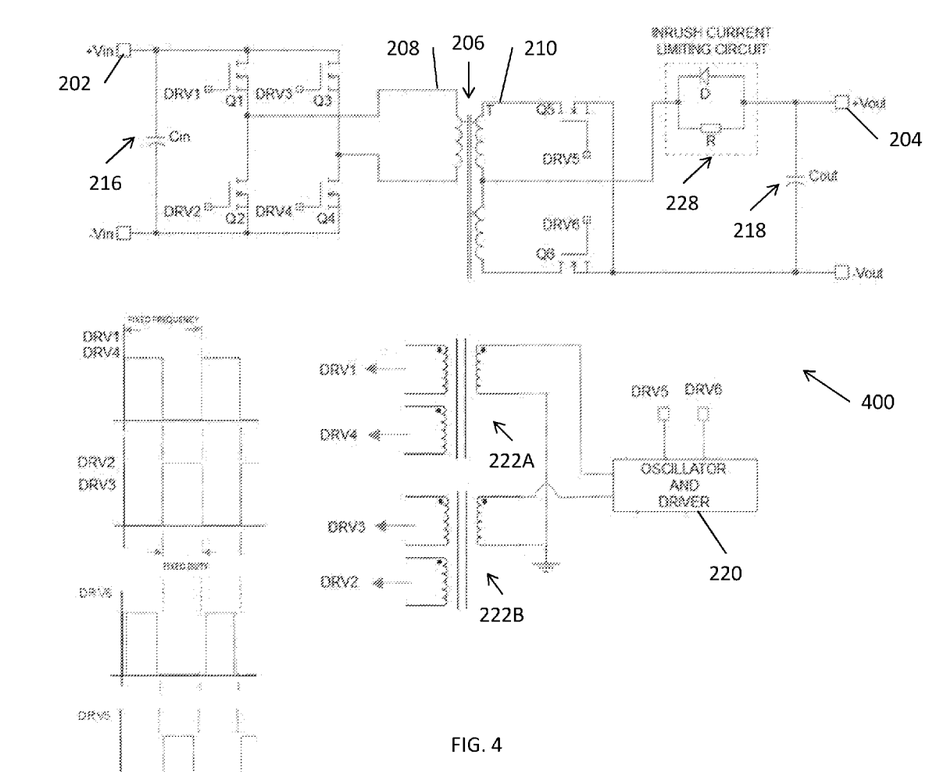
FIG. 4 is a circuit diagram of the open loop bi-directional converter of FIG. 2 having the controller on a secondary side of the transformer.

FIG. 4 illustrates an open loop bi-directional converter 400 according to another example embodiment of the present disclosure. The converter 400 of FIG. 4 is similar to the converter 200 of FIG. 2, but the controller 220 is located on the secondary side 210 of the transformer 206.

In this case, the controller 220 transmits drive signals DRV1 and DRV4 to primary switches Q1 and Q4 via a gate drive transformer 222A. The controller 220 transmits drive signals DRV2 and DRV3 to primary switches Q2 and Q3 via gate drive transformer 222B. The controller 220 can then control primary switches Q1-Q4 from the secondary side 210 of the transformer 206.

In this case, the gate drive transformers 222A and 222B can function as isolators to transfer primary switch control signals from the secondary side of the converter 400 to the primary side of the converter 400. Although FIG. 4 illustrates transmitting the drive signals DRV1-DRV4 via gate drive transformers 222A and 222B, it should be apparent that other embodiments may transmit drive signals DRV1-DRV4 from the secondary side 210 to the primary side 208 via other suitable isolator(s), including opto-couplers, etc.

The controller 220 generates drive signals DRV5 and DRV6 to provide control of secondary switches Q5 and Q6. Because the controller 220 is located on the secondary side 210 in this example, the controller can send drive signals DRV5 and DRV6 to the secondary switches Q5 and Q6 without the need of isolator(s). The converter 400 may not require a secondary side synchronization circuit, a synchronization signal SYNC CLK, auxiliary windings of a transformer for voltage phase detection, etc.

Figure 5:
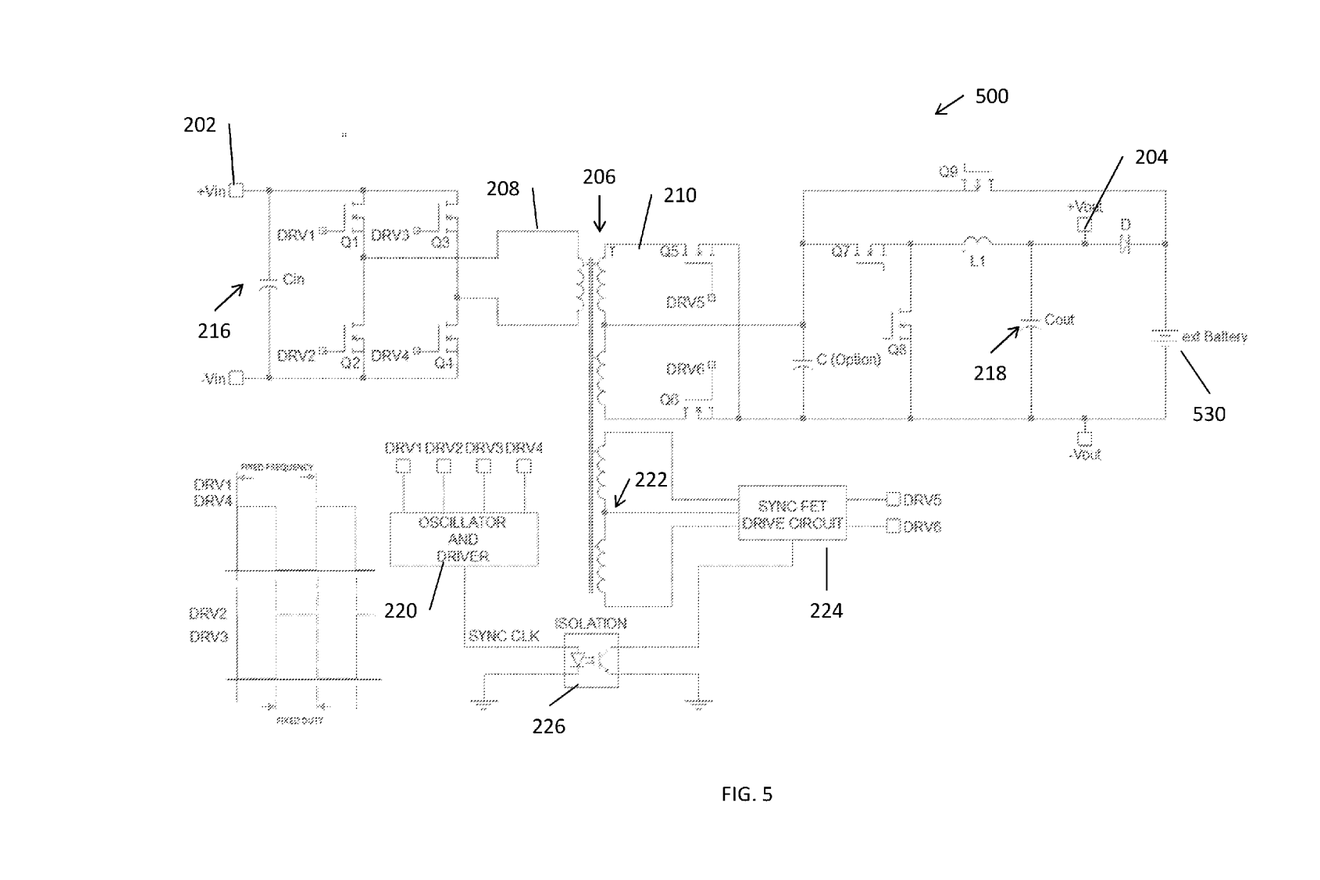
FIG. 5 is a circuit diagram of the open loop bi-directional converter of FIG. 2 having a second converter stage on a secondary side of the transformer.

FIG. 5 illustrates an open loop bi-directional converter 500 according to another example embodiment of the present disclosure. The converter 500 of FIG. 5 is similar to the converter 200 of FIG. 2, but includes a second stage converter coupled between the secondary side 210 of the transformer 206 and the output terminal 204. The converter 500 also includes a battery 530 coupled to the output terminal 204.

In the converter 500, the second stage converter is a buck converter including switches Q7 and Q8, and inductor L1. The buck converter may allow for output voltage regulation when the converter 500 is operating in a charge mode. For example, during the charge mode the converter 500 may operate as a full bridge converter with synchronous rectification and a post-regulated buck synchronous buck converter. During discharge mode, the converter may transfer energy stored in the battery 530 to the primary side 208 of the transformer 206 automatically, when the voltage at the input capacitor 216 reduces below the voltage of the output capacitor 218.

Although FIG. 5 illustrates the second stage converter as a buck converter, other embodiments may include any other suitable converter topologies, including a linear regulator, etc.

The converter 500 may provide one or more (or none) of the following advantages in applications including battery backup: more precise constant current and constant voltage control for battery charging using the post-regulated buck converter, simpler battery discharging for backup where energy is automatically transferred without the need to sense current flow direction or voltage difference to change the mode of operation, a non-isolated feedback loop that provides higher accuracy and increased bandwidth where the only crossing of the isolation barrier is for a frequency synchronization signal between two stages of the converter, etc.

In another embodiment, a method of operating an open loop bi-directional converter is disclosed. The converter includes a transformer having a primary side coupled to an input terminal and a secondary side coupled to an output terminal, one or more primary switches coupled to the primary side of the transformer, one or more secondary switches coupled to the secondary side of the transformer, an input capacitor coupled to the input terminal, and an output capacitor coupled to the output terminal. The method includes controlling the one or more primary switches in an open loop mode at a fixed frequency and a fixed duty cycle, transferring current from the primary side of the transformer to the secondary side of the transformer when a voltage of the input capacitor is greater than a voltage of the output capacitor, and transferring current from the secondary side of the transformer to the primary side of the transformer automatically when the voltage of the input capacitor is reduced below the voltage of the output capacitor.

The method may also include detecting, at an auxiliary winding, a phase of a voltage on the secondary side of the transformer, and controlling the one or more secondary switches based on the detected phase of the voltage on the secondary side of the transformer.

In some embodiments, the method may include transmitting a synchronization signal from the primary side of the converter to the secondary side of the converter. Controlling the one or more secondary switches may include controlling the one or more secondary switches based on the detected phase of the voltage on the secondary side of the transformer and the synchronization signal, to thereby increase an accuracy of controlling the one or more secondary switches.

The converter may include an isolator coupled between a primary side and a secondary side of the converter. In this case, the method may include transmitting a secondary switch control signal from the primary side of the converter to the secondary side of the converter via the isolator to control operation of at least one of the one or more secondary switches. Controlling the one or more primary switches in an open loop mode at a fixed frequency and a fixed duty cycle may include transmitting a primary switch control signal from the secondary side of the converter to the primary side of the converter via the isolator to control operation of at least one of the one or more primary switches.

In another example, controlling the one or more primary switches in an open loop mode at a fixed frequency and a fixed duty cycle may include transmitting a primary switch control signal from the secondary side of the converter to the primary side of the converter via at least one isolator to control operation of at least one of the one or more primary switches.

Any of the example embodiments and aspects disclosed herein may be used in any suitable combination with any other example embodiments and aspects disclosed herein without departing from the scope of the present disclosure. For example, open loop bi-directional converters described herein may implement other control methods, the control methods described herein may be implemented in other open loop bi-directional converters, etc. without departing from the scope of the present disclosure.

Example embodiments and aspects of the present disclosure may provide any of the following advantages. The converter may not require a control signal for directing power-flow, as the reverse/discharge direction of operation may occur automatically when the voltage at the input capacitor(s) decrease below the voltage at the output capacitor(s). This may reduce a voltage dip at the input capacitor(s) when the operating mode of the converter changes, and may reduce the need for complicated signal control and timing control when the operating mode of the converter changes. Some embodiments may provide regulated secondary output voltage, may increase hold-up time of configurable power supplies (e.g., without affecting front-end case design), may allow for multiple bi-directional converters to be used in parallel where increase of the hold-up time could be linear with the number of bi-directional converters used, may provide battery backup modules for configurable power supplies to reduce the need for an uninterruptible power supply for the backup power requirement, such that backup power duration may be dictated only by the capacity of the battery, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An open loop bi-directional converter comprising:
an input terminal for receiving an input voltage;
an output terminal for providing an output voltage to a load;
a transformer coupled between the input terminal and the output terminal, the transformer having a primary side and a secondary side;
one or more primary switches coupled between the input terminal and the primary side of the transformer;
one or more secondary switches coupled between the output terminal and the secondary side of the transformer;
an input capacitor coupled to the input terminal;
an output capacitor coupled to the output terminal; and
a primary side controller coupled to the one or more primary switches, the primary side controller operable to control the one or more primary switches in an open loop mode at a fixed frequency and a fixed duty cycle;
wherein the open loop bi-directional converter is coupled to provide current from the primary side of the transformer to the secondary side of the transformer when a voltage of the input capacitor is greater than a voltage of the output capacitor, and the open loop bi-directional converter is coupled to automatically provide current from the secondary side of the transformer to the primary side of the transformer when the voltage of the input capacitor is reduced below the voltage of the output capacitor.

2. The converter of claim 1, wherein the one or more primary switches comprise a half-bridge circuit having at least two switches.

3. The converter of claim 1, wherein the one or more primary switches comprise a full-bridge circuit having four switches.

4. The converter of claim 1, wherein the one or more secondary switches include at least two switches arranged in a push-pull circuit topology.

5. The converter of claim 1, further comprising a secondary side controller operable to control the one or more secondary switches in an open loop mode at a fixed frequency and a fixed duty cycle.

6. The converter of claim 5, wherein the transformer includes an auxiliary winding on the secondary side of the transformer, the secondary side controller coupled to the auxiliary winding to detect a phase of the voltage on the secondary side of the transformer, the secondary side controller operable to control the one or more secondary switches based on the detected phase of the voltage on the secondary side of the transformer.

7. The converter of claim 6, further comprising an isolator coupled between the primary side controller and the secondary side controller, the isolator coupled to provide a synchronization signal from the primary side controller to the secondary side controller to increase an accuracy of the secondary side controller in controlling the phase of the one or more secondary switches.

8. The converter of claim 1, further comprising an inrush limiting resistor coupled between the output terminal and the secondary side of the transformer to inhibit an inrush current at startup of the open loop bi-directional converter.

9. The converter of claim 8, further comprising a diode coupled in parallel with the inrush limiting resistor.

10. The converter of claim 1, further comprising a current limiting switch coupled between the output terminal and the secondary side of the transformer to inhibit an inrush current at startup of the open loop bi-directional converter using active current limiting.

11. The converter of claim 1, wherein the open loop bi-directional converter does not include any closed loop feedback for controlling the one or more primary side switches and the one or more secondary side switches.

12. The converter of claim 1, wherein the open loop bi-directional converter is coupled to automatically change direction of the current flow through the transformer without changing a switching operation of the one or more primary side switches and the one or more secondary side switches.

13. The converter of claim 1, further comprising a second stage converter coupled between the output terminal and the secondary side of the transformer.

14. The converter of claim 13, wherein the second stage converter includes a buck converter.

15. The converter of claim 13, wherein the second stage converter includes a linear regulator.

16. The converter of claim 1, further comprising a first isolator and a second isolator coupled between the primary side of the transformer and the secondary side of the transformer, wherein:
the one or more secondary side switches include at least two secondary switches;
the controller is operable to provide a first drive signal to a first one of the at least two secondary switches via the first isolator; and
the controller is operable to provide a second drive signal to a second one of the at least two secondary switches via the second isolator.

17. An open loop bi-directional converter comprising:
an input terminal for receiving an input voltage;
an output terminal for providing an output voltage to a load;
a transformer coupled between the input terminal and the output terminal, the transformer having a primary side and a secondary side;
one or more primary switches coupled between the input terminal and the primary side of the transformer;
one or more secondary switches coupled between the output terminal and the secondary side of the transformer;
an input capacitor coupled to the input terminal;
an output capacitor coupled to the output terminal;
a secondary side controller coupled to the one or more primary switches and the one or more secondary switches, the secondary side controller operable to control the one or more primary switches and the one or more secondary switches in an open loop mode at a fixed frequency and a fixed duty cycle;
wherein the open loop bi-directional converter is coupled to provide current from the primary side of the transformer to the secondary side of the transformer when a voltage of the input capacitor is greater than a voltage of the output capacitor, and the open loop bi-directional converter is coupled to automatically provide current from the secondary side of the transformer to the primary side of the transformer when the voltage of the input capacitor is reduced below the voltage of the output capacitor.

18. The open loop bi-directional converter of claim 17, further comprising one or more isolators coupled between the primary side of the transformer and the secondary side of the transformer, wherein the secondary side controller is coupled to the one or more primary switches via the one or more isolators.

19. A method of operating an open loop bi-directional converter including a transformer having a primary side coupled to an input terminal and a secondary side coupled to an output terminal, one or more primary switches coupled to the primary side of the transformer, one or more secondary switches coupled to the secondary side of the transformer, an input capacitor coupled to the input terminal, and an output capacitor coupled to the output terminal, the method comprising:

controlling the one or more primary switches in an open loop mode at a fixed frequency and a fixed duty cycle;

transferring current from the primary side of the transformer to the secondary side of the transformer when a voltage of the input capacitor is greater than a voltage of the output capacitor; and transferring current from the secondary side of the transformer to the primary side of the transformer automatically when the voltage of the voltage of the input capacitor is reduced below the voltage of the output capacitor.

20. The method of claim 19, wherein the open loop bi-directional converter does not include any closed loop feedback for controlling the one or more primary side switches and the one or more secondary side switches, and transferring current from the secondary side of the transformer to the primary side of the transformer includes automatically changing a direction of the current flow through the transformer without changing a switching operation of the one or more primary side switches and the one or more secondary side switches.

* * * * *